(12) United States Patent
Kim et al.

(10) Patent No.: US 11,220,334 B2
(45) Date of Patent: Jan. 11, 2022

(54) HIGH EFFICIENCY LONG RANGE DRONE

(71) Applicant: KOREA AEROSPACE RESEARCH INSTITUTE, Daejeon (KR)

(72) Inventors: Keun Bae Kim, Daejeon (KR); Bo Hwa Lee, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 381 days.

(21) Appl. No.: 16/197,112

(22) Filed: Nov. 20, 2018

(65) Prior Publication Data

US 2019/0152596 A1    May 23, 2019

(30) Foreign Application Priority Data

Nov. 23, 2017   (KR) ........................ 10-2017-0157335

(51) Int. Cl.
| | |
|---|---|
| *B64C 39/02* | (2006.01) |
| *B64D 27/04* | (2006.01) |
| *B64D 27/24* | (2006.01) |
| *B64D 27/02* | (2006.01) |

(52) U.S. Cl.
CPC ............ *B64C 39/024* (2013.01); *B64D 27/04* (2013.01); *B64D 27/24* (2013.01); *B64C 2201/027* (2013.01); *B64C 2201/042* (2013.01); *B64C 2201/044* (2013.01); *B64C 2201/108* (2013.01); *B64D 2027/026* (2013.01)

(58) Field of Classification Search
CPC .. B64D 27/02; B64D 2027/026; B64D 27/04; B64D 27/24; B64C 2201/024; B64C 2201/042; B64C 2201/102; B64C 2201/108; B64C 2201/146
See application file for complete search history.

(56) References Cited

U.S. PATENT DOCUMENTS

| | | | |
|---|---|---|---|
| 9,878,786 B2* | 1/2018 | Chan ...................... | B64C 27/52 |
| 10,696,414 B2* | 6/2020 | Woodman ............... | B64C 25/54 |
| 2015/0259066 A1* | 9/2015 | Johannesson ............ | B64C 1/30 244/17.27 |
| 2017/0043870 A1* | 2/2017 | Wu ......................... | B64C 39/024 |
| 2017/0297707 A1* | 10/2017 | Rollefstad ............ | G05D 1/0005 |
| 2019/0092464 A1* | 3/2019 | Gomez Gutierrez ... | B64C 37/00 |
| 2019/0256202 A1* | 8/2019 | Resnick ................. | B64C 27/08 |

FOREIGN PATENT DOCUMENTS

| | | | | |
|---|---|---|---|---|
| KP | 0-102016-0102826 | * | 8/2016 | ............ B64C 39/02 |
| KR | 20110104405 A | | 9/2011 | |
| KR | 20170114354 A | | 10/2017 | |

* cited by examiner

*Primary Examiner* — Joshua J Michener
*Assistant Examiner* — Cindi M Curry
(74) *Attorney, Agent, or Firm* — McCoy Russell LLP (57) ABSTRACT

Provided is a high efficiency long range drone, and more particularly, a high efficiency long range drone capable of increasing flight time and efficiently using power during long range cruising flight by selectively using the power among an engine generator and a battery and applying an auxiliary wing.

12 Claims, 12 Drawing Sheets

HIGH EFFICIENCY LONG RANGE DRONE

CROSS-REFERENCE TO RELATED APPLICATIONS

This application claims priority under 35 U.S.C. § 119 to Korean Patent Application No. 10-2017-0157335, filed on Nov. 23, 2017, in the Korean Intellectual Property Office, the disclosure of which is incorporated herein by reference in its entirety.

TECHNICAL FIELD

The following disclosure relates to a high efficiency long range drone, and more particularly, to a high efficiency long range drone which may increase flight time and efficiently use power during long range flight.

BACKGROUND

A drone refers to an unmanned aerial vehicle that may operate (fly) by remote control. The drone may be classified into a fixed wing type, a rotor wing type, and the like according to a method of generating thrust. The rotor wing type drone is widely used, which does not require a large area of a runway due to takeoff and landing than the fixed wing type drone that requires the runway for takeoff and landing.

The rotor wing type drone is formed in a multicopter system such as a quadcopter in which thrust means (generally, propellers) for generating a thrust is spaced apart from each other by a predetermined distance, and may ascend, descend, and hover (hovering flight in situ), and move in the forward, backward, left, and right directions through the control of rotational speed of the thrust means.

Here, since the rotor wing type drone mainly uses a battery as a power supply source for supplying power to enable rotation of the propeller for generating the thrust, the power supply source may be easily replaced and the drone may operate through a simple operation according to charging and discharging. However, due to the limited capacity of the battery, flight time is shortened to about 30 minutes, which limits the area for the drone to be widely used in society.

In particular, the battery used in the drone is generally a lithium-polymer battery. Since the lithium-polymer battery has a high discharge rate, but has a low energy density, the flight time of the drone is shorter than that of an internal combustion engine in the same weight condition, and weight that may be mounted (loaded) for mission performance is also small. Therefore, the drone using the lithium-polymer battery is only used for tasks such as courier, shooting, search, surveillance, and agricultural purposes, and thus has a problem in that the mission performance is limited.

SUMMARY

An embodiment of the present invention is directed to providing a high efficiency long range drone capable of increasing a mission performance area as compared to a conventional drone by forming a power supplying part that supplies power to a thrust generating part generating a thrust as a basic power supplying part formed by an engine generator and an auxiliary power supplying part formed by a battery, and selectively supplying the power through the control thereof.

An embodiment of the present invention is directed to providing a high efficiency long range drone capable of efficiently performing a long-range flight by being used as an auxiliary wing through a position movement of a thrust generating part when it is formed as a quadcopter to be supplied with power from a basic power supplying part and using the auxiliary wing.

In one general aspect, a high efficiency long range drone includes: a body 100; a thrust generating part 200 including a support 210 connected to the body 100 in a horizontal direction and a thrust means 220 provided at an end of the support 210 to generate a thrust; a power supplying part 300 including a basic power supplying part 310 formed by an engine generator and an auxiliary power supplying part 320 formed by a battery, and supplying power to the thrust generating part 200; and a controlling part 400 controlling operations of the thrust generating part 200 and the power supplying part 300.

The controlling part 400 may perform a control so that the power is supplied to the thrust generating part 200 by using the basic power supplying part 310 and the auxiliary power supplying part 320, or the power is supplied to the thrust generating part 200 by using only the basic power supplying part 310.

The body 100 may include an upper body 110, a lower body 120 formed below the upper body 110 and having a landing platform provided on a lower surface thereof, and a rotation shaft 130 connecting the upper body 110 and the lower body 120 to each other in a vertical direction and formed so that the support 210 is coupled to and detachable from the central shaft 130 in a horizontal direction.

The thrust means 220 may include a rotating part 221 including a propeller generating the thrust by rotation, and a motor 222 performing an operation of the rotating part 221 through the power supplied from the power supplying part 300.

The high efficiency long range drone 1000 may be a quadcopter in which four thrust generating parts 200 are formed to be spaced apart from each other at the same intervals in the horizontal direction.

The thrust generating part 200 may include first thrust generating parts P1 and P2 formed to face each other in one direction, and second thrust generating parts P3 and P4 perpendicular to the first thrust generating parts P1 and P2 and formed to face each other in the other direction.

The first thrust generating parts P1 and P2 may be formed to generate a thrust larger than the second thrust generating parts P3 and P4.

The rotating parts 221 of the first thrust generating parts P1 and P2 may be formed to have a relatively large propeller size in order to generate a thrust larger than that of the rotating parts 221 of the second thrust generating parts P3 and P4, and the motors 222 of the first thrust generating parts P1 and P2 may be provided to generate an output larger than that of the motors 222 of the second thrust generating parts P3 and P4.

The second thrust generating parts P3 and P4 may be moved in a selected direction in the horizontal direction and be positioned on the same line as the first thrust generating parts P1 and P2, and selected supports of the second thrust generating parts P3 and P4 and the first thrust generating parts P1 and P2 may be positioned on the same line to form a single wing shape.

The thrust means 220 of the first thrust generating parts P1 and P2 may be formed on an upper surface of the support 210, and the thrust means 220 of the second thrust generating parts P3 and P4 may be formed on a lower surface of the support 210.

The central shaft 130 may include a first pressurizing means 131 formed on the upper body 110 and formed to apply force to the second thrust generating parts P3 and P4 in the directions of the first thrust generating parts P1 and P2.

The first pressurizing means 131 may be formed to apply the force to the second thrust generating parts P3 and P4 with the force smaller than the moment of inertia of the first thrust generating parts P1 and P2.

The upper body 110 may include guide holes 111 corresponding to movement paths of the supports 210 of the second thrust generating parts P3 and P4 and formed to penetrate through the upper body 110, the supports 210 of the second thrust generating parts P3 and P4 may include guide protrusions 211 moved to penetrate through the guide holes 111 in a vertical direction below thereof, and the lower body 120 may include lower guide protrusions 122 that are formed to protrude on an upper surface thereof and are in surface contact with the guide protrusions 211 to move the lower body 120.

The central shaft 130 may further include a second pressurizing means 132 formed on the lower body 120 and applying force to the lower body 120 in the directions of the first thrust generating parts P1 and P2.

The second pressurizing means may apply the force to the lower body 120 with a smaller force than the first pressurizing means.

DETAILED DESCRIPTION OF MAIN ELEMENTS

1000: high efficiency long range drone
100: body
110: upper body
111: guide hole
120: lower body
121: landing platform
122: lower guide protrusion
130: central shaft
131: first pressurizing mean
132: second pressurizing mean
200: thrust generating part
210: support
211: guide protrusion
220: thrust means
221: rotating part
222: motor
300: power supplying part
310: basic power supplying part
320: auxiliary power supplying part
400: controlling part
P1, P2: first thrust generating part
P3, P4: second thrust generating part

DETAILED DESCRIPTION OF EMBODIMENTS

Hereinafter, a high efficiency long range drone according to the present invention as described above will be described in detail with reference to the accompanying drawings.

First Exemplary Embodiment

Figure 1:
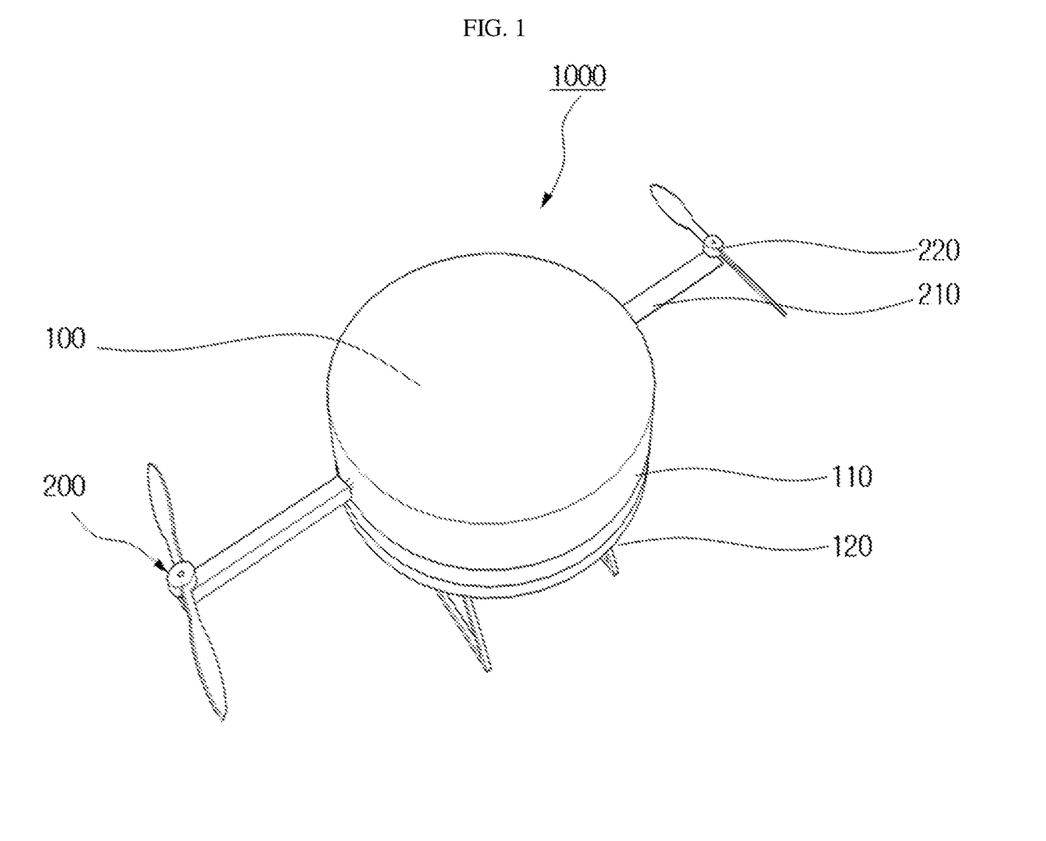
FIG. 1 is a perspective view of a high efficiency long range drone according to a first exemplary embodiment of the present invention.
Figure 2:
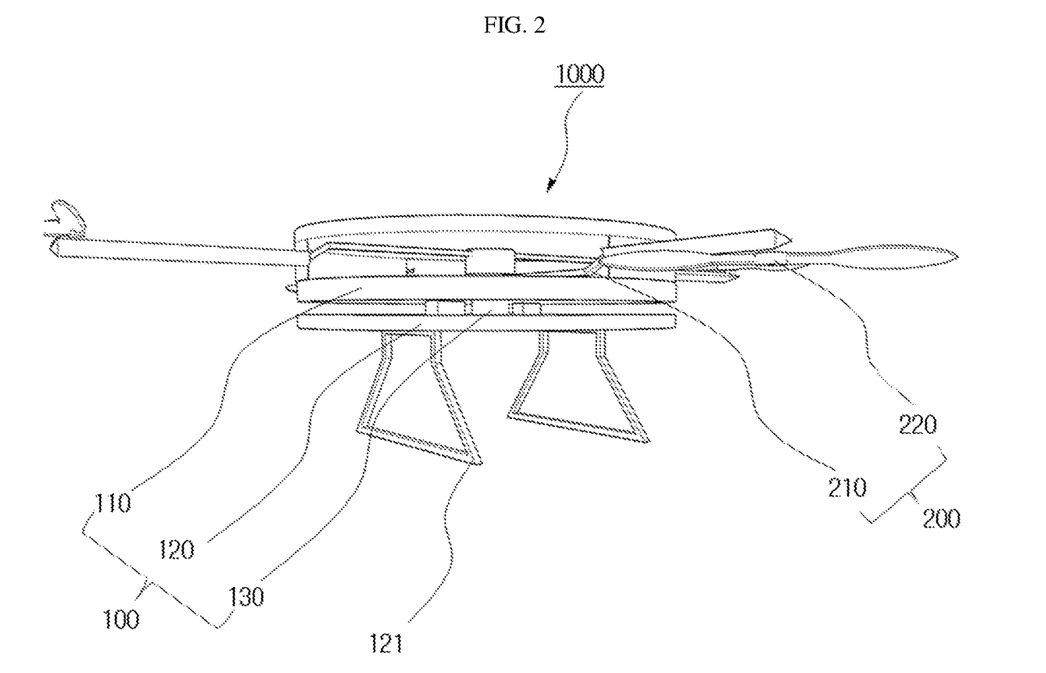
FIG. 2 is another perspective view of the high efficiency long range drone according to the first exemplary embodiment of the present invention.
Figure 3:
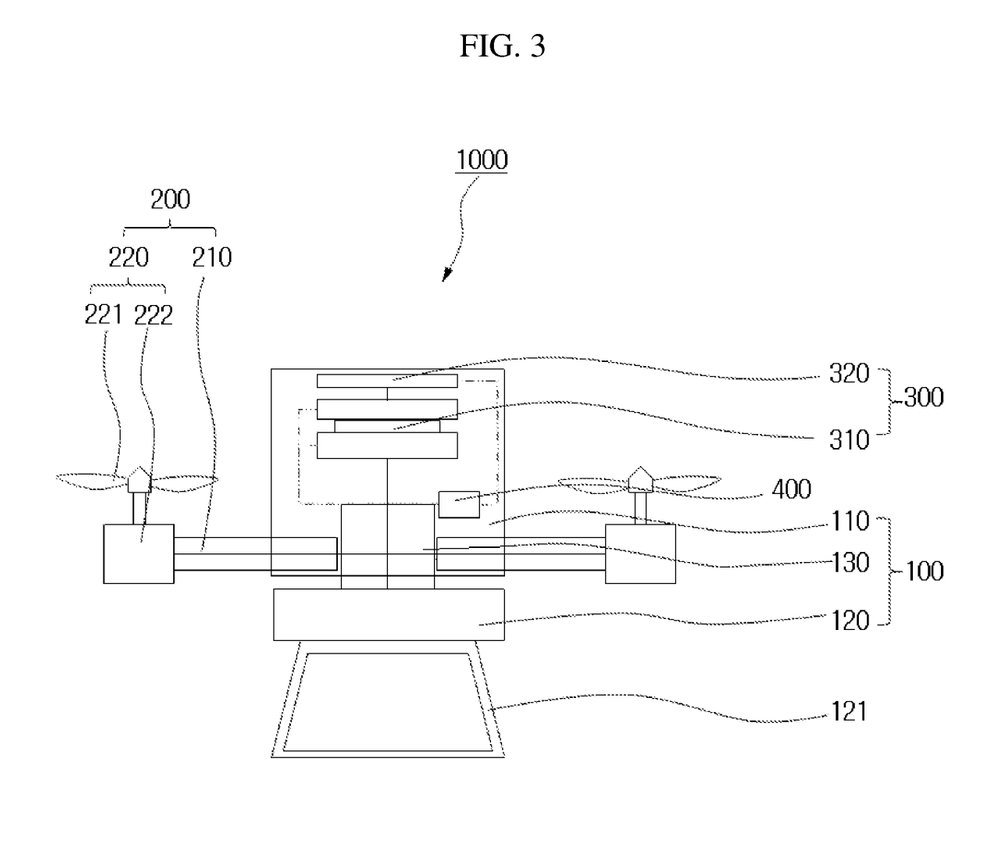
FIG. 3 is a conceptual view of the high efficiency long range drone according to the first exemplary embodiment of the present invention.

FIG. 1 is a perspective view of a high efficiency long range drone according to a first exemplary embodiment of the present invention, FIG. 2 is another perspective view of the high efficiency long range drone according to the first exemplary embodiment of the present invention, and FIG. 3 is a conceptual view of the high efficiency long range drone according to the first exemplary embodiment of the present invention.

Referring to FIGS. 1 to 3, a high efficiency long range drone 1000 according to a first exemplary embodiment of the present invention generally includes a body 100, thrust generating parts 200 generating a thrust, a power supplying part 300 that supplies power to the thrust generating part 200 for operation of the thrust generating part 200, and a controlling part 400 controlling an operation of the power supplying part 300.

The body 100 is preferably formed to accommodate the power supplying part 300 and the controlling part 400 therein, or to have the power supplying part 300 and the controlling part 400 which are coupled to the outside thereof, and is preferably formed to have a mission performance object according to a selected mission as well as the power supplying part 300 and the controlling part 400 which are fixed to the outside thereof, or to accommodate them therein.

The thrust generating part 200 generates a thrust to enable the drone to fly, and generally includes a support 210 connected to the body 100 in a horizontal direction and a thrust means 220 provided at an end of the support 210 to generate the thrust.

The power supplying part 300 supplies power to the thrust generating part 200 to enable the trust generating part 300 to generate the thrust according to an operation of the thrust means 220.

In this case, the power supplying part 300 includes a basic power supplying part 310 formed by an engine generator and an auxiliary power supplying part 320 formed by a battery, and allows the basic power supplying part 310 and the auxiliary power supplying part 320 to simultaneously supply the power to the thrust generating part 200, or allows only the basic power supplying part 310 to supply the power to the thrust generating part 200 according to the thrust to be generated.

The controlling part 400 controls an operation of the power supplying part 300, and enables the drone to ascend, descend, and hover, and to move in the forward, backward, left, and right directions through the control of the operation of the power supplying part 300.

That is, the high efficiency long range drone 1000 according to the first exemplary embodiment of the present invention includes the power supplying part 300 including the basic power supplying part 310 formed by the engine generator including an engine and a generator of an internal combustion engine, and the auxiliary power supplying part 320 formed by a battery, unlike the conventional drone that supplies the power by using only the battery. As a result, the high efficiency long range drone 1000 may supply the power to the thrust generating parts 200 through the basic power supplying part 310 and the auxiliary power supplying part 320 in order to generate a large thrust, and may supply the power to the thrust generating part 200 through only the basic power supplying part 310 when a relatively large thrust is not required.

In other words, when a large thrust is required for taking off or hovering the drone, the power is supplied to the thrust generating part 200 by using the basic power supplying part 310 and the auxiliary power supplying part 320 to cause the thrust generating part 200 to generate the large thrust, and when a relatively small thrust is required for high-speed flight or long range cruising of the drone, the power is supplied to the thrust generating part 200 by using only the basic power supplying part 310 to cause the thrust generating part 200 to generate a relatively small thrust as compared to when taking off or hovering of the drone.

Further, when the power is supplied to the thrust generating part 200 by using only the basic power supplying part 310, it is possible to perform charging of the auxiliary power supplying part 320 formed by the battery, if necessary, and it is advantageous in that it is not necessary to separately charge the battery for flight of the drone.

In this case, the engine-generator of the basic power supplying part 310 operates at a constant speed in the highest efficiency range to achieve an optimal performance.

This is advantageous in that as the auxiliary power supplying part 320 may be operated and charged according to the need, thereby enabling a long range flight as compared to the conventional drone.

The high efficiency long range drone 1000 according to the first exemplary embodiment of the present invention will be described in more detail.

The body 100 includes an upper body 110, a lower body 120, and a central shaft 130.

The upper body 110 may include the power supplying part 300 including the basic power supplying part 310 and the auxiliary power supplying part 320 described above, and may also accommodate the controlling part 400 controlling the operation of the power supplying part 300.

The lower body 120 may be formed below the upper body 110, and a lower surface of the lower body 120 may be provided with a landing platform 121 that is in contact with the ground when the drone lands on the ground.

The central shaft 130 is formed to vertically connect the upper body 110 and the lower body 120 to each other to thereby connect between the upper body 110 and the lower body 120, and the support 210 is formed to be coupled to and detachable from the central shaft 130 in a horizontal direction.

Here, since the central shaft 130 is formed to connect the upper body 110 and the lower body 120 to each other and has the support 210 coupled thereto, it is preferable to form the central shaft 130 at the center of the upper body 110 and the lower body 120 to maintain balance.

In addition, since the support 210 is formed to be coupled to and detachable from the central shaft 130, and the power supplying part 300 and the controlling part 400 that supply the power to the thrust generating part 200 or control the supply of the power are formed in the upper body 110, the upper body 110 is preferably formed in a shape having a predetermined space therein around the central shaft 130.

Further, the thrust generating means 220 of the thrust generating part 200 includes a rotating part 221 and a motor 222. The rotating part 221 is preferably formed by a propeller generating the thrust by rotation, and the motor 222 performs an operation of the rotating part 221 through the power supplied from the power supplying part 300 to thereby generate the thrust.

In this case, it is preferable that at least two propellers of the rotating part 221 are provided, but various exemplary embodiments are possible without limitation. Since the configuration of the rotor wing type drone generating the thrust by the rotation of the propeller is a well-known technology, a detailed description of the shape of the propeller and the like will be omitted.

Second Exemplary Embodiment

Figure 4:
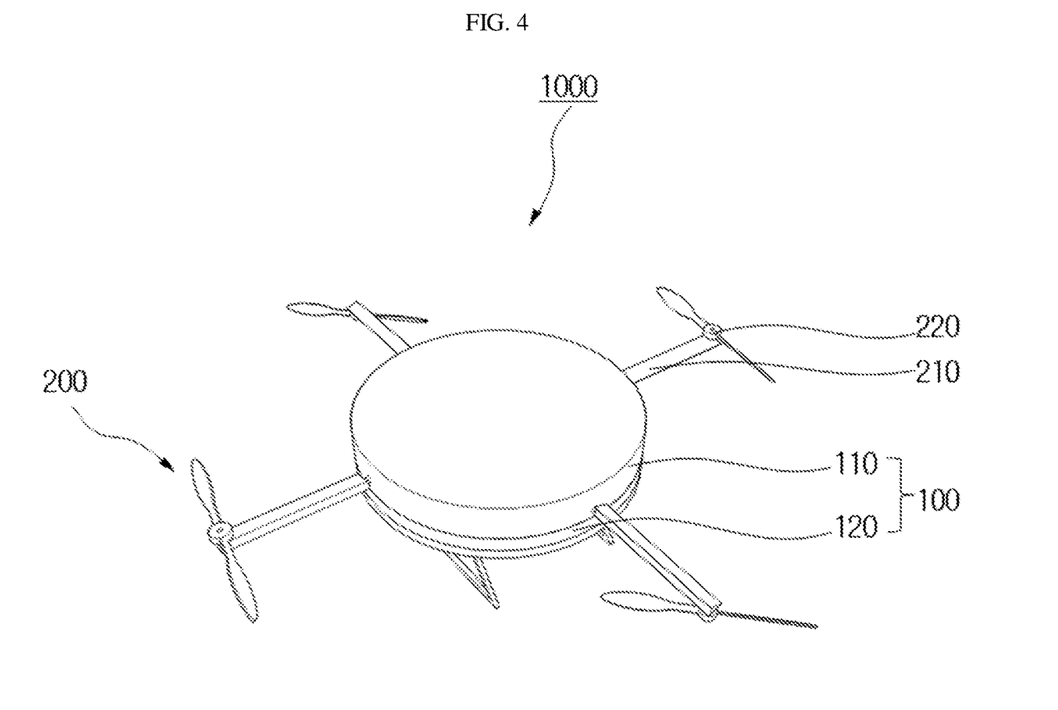
FIG. 4 is a perspective view of a high efficiency long range drone according to a second exemplary embodiment of the present invention.
Figure 5:
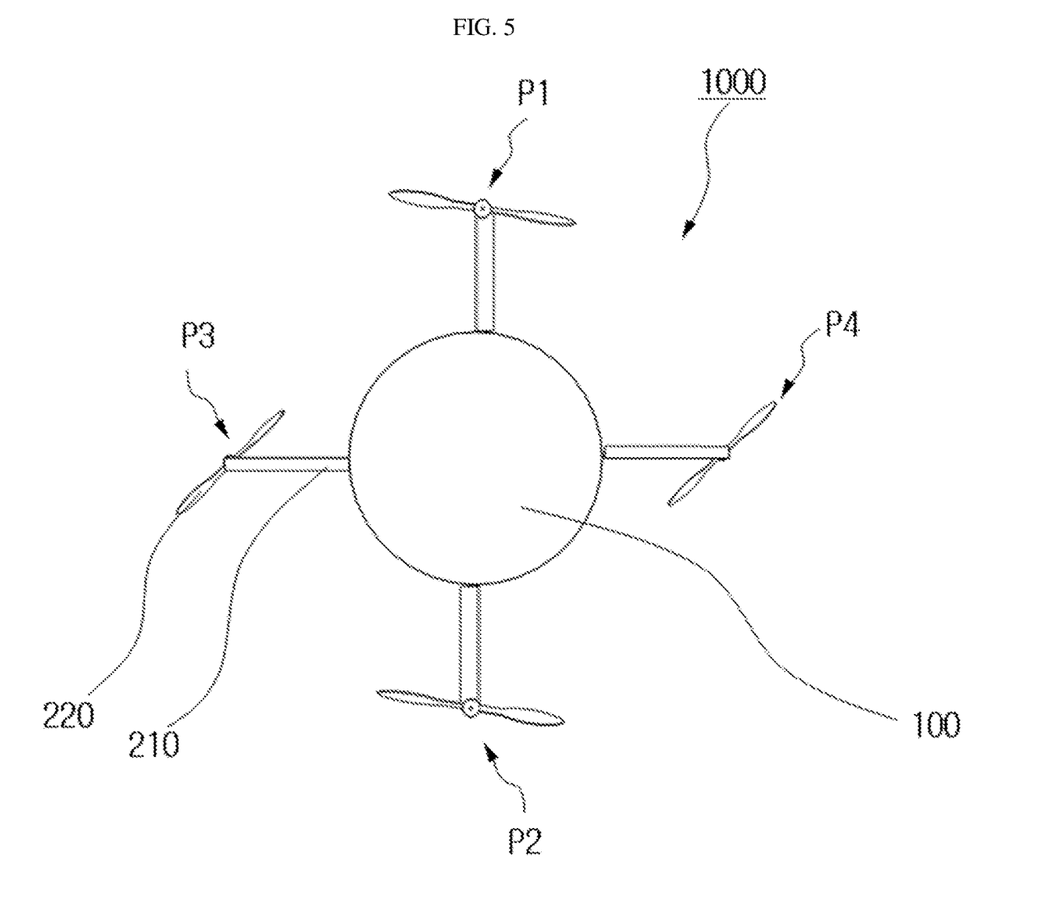
FIG. 5 is a plan view of the high efficiency long range drone according to the second exemplary embodiment of the present invention.

FIG. 4 is a perspective view of a high efficiency long range drone according to a second exemplary embodiment of the present invention and FIG. 5 is a plan view of the high efficiency long range drone according to the second exemplary embodiment of the present invention.

The high efficiency long range drone 1000 according to the second exemplary embodiment of the present invention may be a quadcopter in which four thrust generating parts 200 are formed to be spaced apart from each other at equal intervals in the horizontal direction.

Further, the thrust generating part 200 of the high efficiency long range drone 1000 according to the second exemplary embodiment of the present invention includes first thrust generating parts P1 and P2 facing each other in one direction, and second thrust generating parts P3 and P4 perpendicular to the first thrust generating parts P1 and P2 and facing each other in the other direction.

That is, the first thrust generating parts P1 and P2 and the second thrust generating parts P3 and P4 of the thrust generating part 200 generate the thrust, and may control a movement and a rotation of the drone in the forward, backward, left, and right directions through the control of rotation speed thereof.

In this case, the thrust means 220 of the first thrust generating parts P1 and P2 is formed so as to generate a thrust larger than that of the thrust means 220 of the second thrust generating parts P3 and P4. To this end, the rotating part 221 and the motor 222 configuring the thrust means 220 of the first thrust generating parts P1 and P2 are formed so as to generate an output and a thrust larger than those of the rotating part 221 and the motor 222 configuring the thrust means 220 of the second thrust generating parts P3 and P4.

More specifically, the motors 222 of the first thrust generating parts P1 and P2 are provided to generate an output larger than that of the motors 222 of the second thrust generating parts P3 and P4, and the rotating parts 221 of the first thrust generating parts P1 and P2 are formed to have a relatively large propeller size in order to generate a thrust larger than that of the rotating parts 221 of the second thrust generating parts P3 and P4.

That is, when a large thrust is required for taking off or hovering the drone, the power is supplied through the basic power supplying part 310 and the auxiliary power supplying part 320, and both the first thrust generating parts P1 and P2 and the second thrust generating parts P3 and P4 generate the thrust to generate a large thrust.

In other words, when the drone 1000 including a hybrid power system according to the second exemplary embodiment of the present invention requires a large thrust for taking off or hovering, the power source includes the basic power supplying part 310 and the auxiliary power supplying part 320, and a total thrust generated through the basic power supplying part 310 and the auxiliary power supplying part 320 is the sum of the thrusts generated by the first thrust generating parts P1 and P2 and the second thrust generating parts P3 and P4.

On the contrary, when a relatively large thrust is not required for high-speed flight or long range cruising, only the basic power supplying part 310 supplies the power and only the first thrust generating parts P1 and P2 generate the thrust.

In other words, when a large thrust is not required for high-speed flight or long range cruising, the drone 1000 including the hybrid power system according to the second exemplary embodiment of the present invention includes only the basic power supplying part 310 as the power source, and a total thrust generated through the basic power supplying part 310 is a thrust generated in only the first thrust generating parts P1 and P2.

Further, the drone 1000 including the hybrid power system according to the second exemplary embodiment of the present invention is preferably formed so that the rotating parts 221 of the first thrust generating parts P1 and P2 rotate in a clockwise direction, and the rotating parts 221 of the second thrust generating parts P3 and P4 rotate in a counterclockwise direction, but is not limited thereto.

Third Exemplary Embodiment

Figure 6:
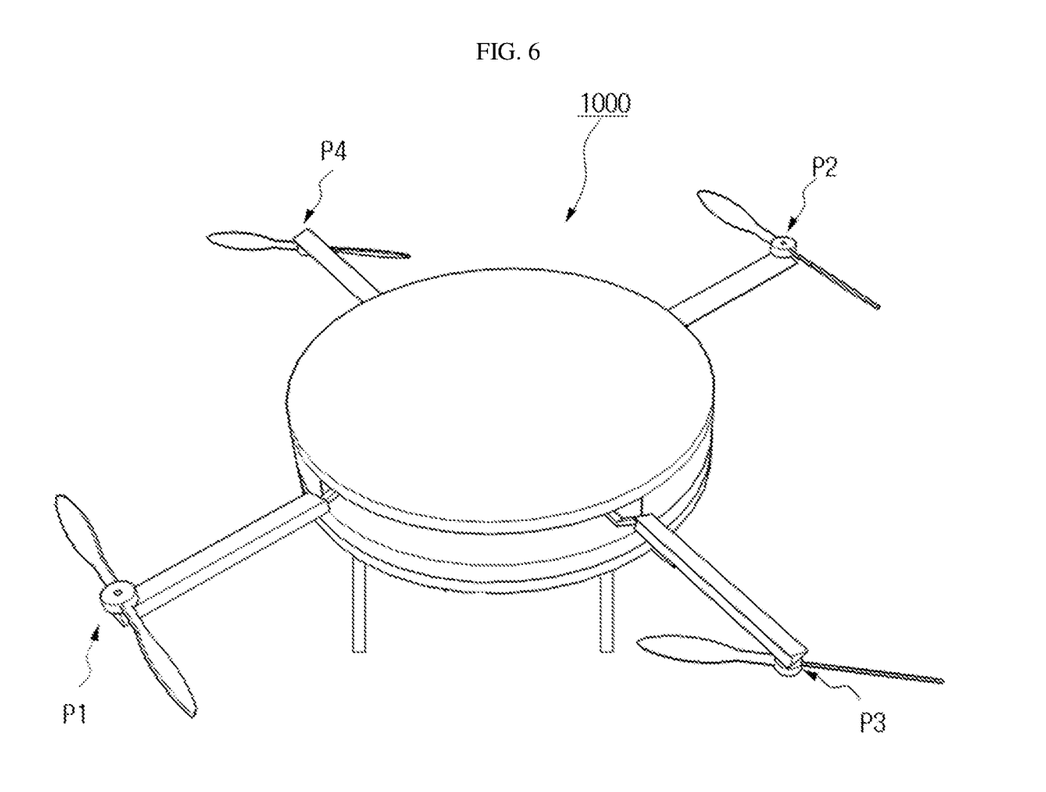
FIG. 6 is a perspective view of a high efficiency long range drone according to a third exemplary embodiment of the present invention.
Figure 7:
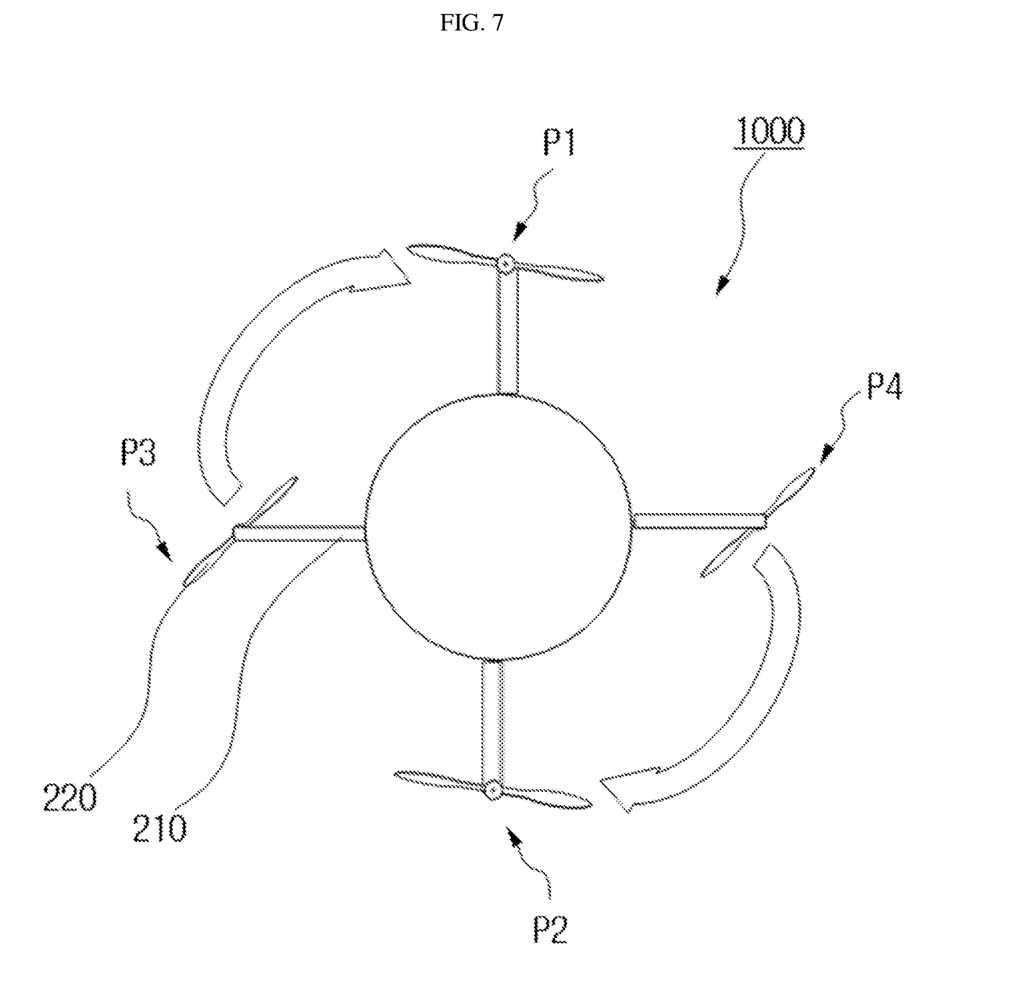
FIG. 7 is a plan view of the high efficiency long range drone according to the third exemplary embodiment of the present invention.
Figure 8:
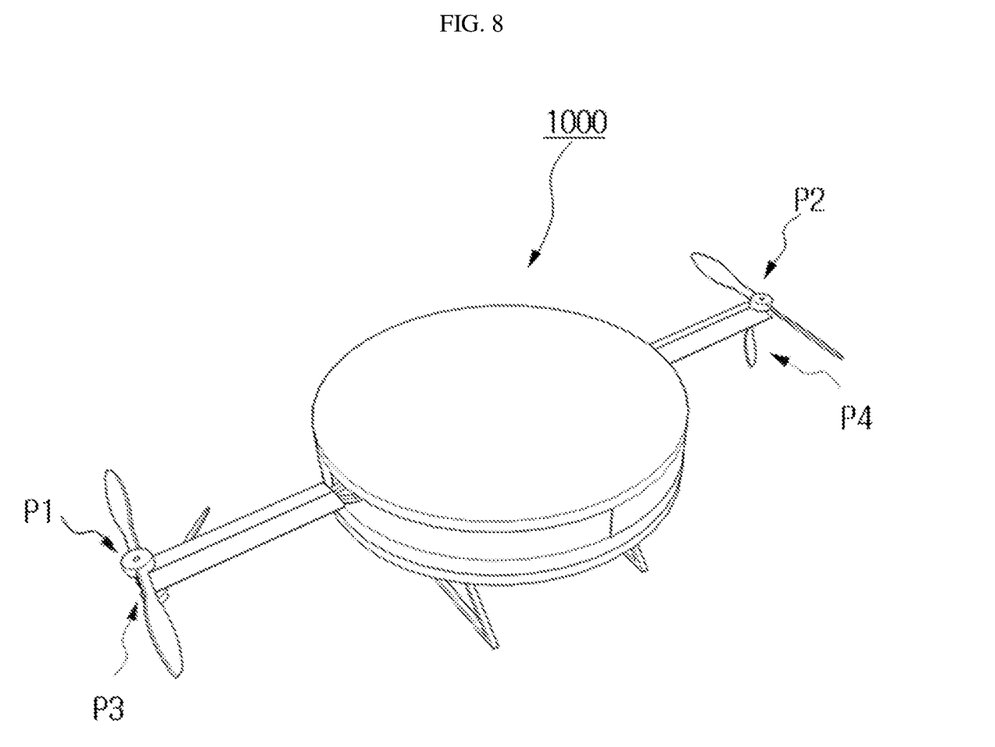
FIG. 8 is another perspective view of the high efficiency long range drone according to the third exemplary embodiment of the present invention.
Figure 9:
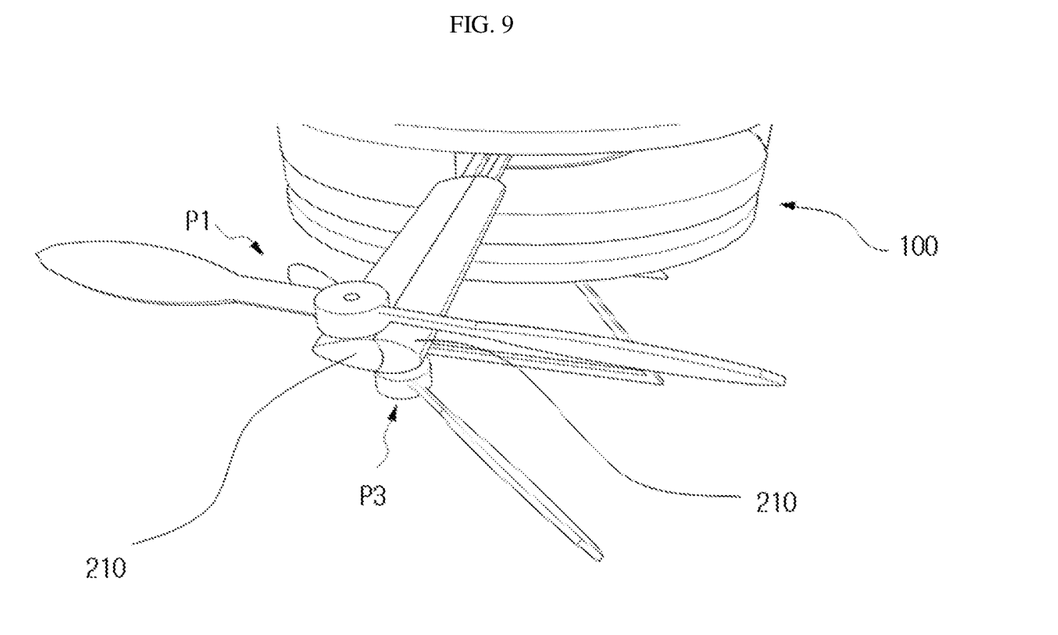
FIG. 9 is an enlarged view of a support of the high efficiency long range drone according to the third exemplary embodiment of the present invention.

FIG. 6 is a perspective view of a high efficiency long range drone according to a third exemplary embodiment of the present invention, FIG. 7 is a plan view of the high efficiency long range drone according to the third exemplary embodiment of the present invention, FIG. 8 is another perspective view of the high efficiency long range drone according to the third exemplary embodiment of the present invention, and FIG. 9 is an enlarged view of a support of the high efficiency long range drone according to the third exemplary embodiment of the present invention.

Referring to FIGS. 6 to 9, in the high efficiency long range drone 1000 according to the third exemplary embodiment of the present invention, the second thrust generating parts P3 and P4 may be moved in a selected direction in the horizontal direction and be positioned on the same line as the first thrust generating parts P1 and P2.

In particular, it is preferable that the second thrust generating parts P3 and P4 are moved so that P1 and P3 are positioned on the same line and P2 and P4 are positioned on the same line.

That is, the second thrust generating parts P3 and P4 are movable in the selected direction so as to be positioned to be perpendicular to the first thrust generating parts P1 and P2, or positioned on the same line as the first thrust generating parts P1 and P2.

In other words, during high-speed flight or cruising, the second thrust generating parts P3 and P4 stop to generate the thrust and the first thrust generating parts P1 and P2 continue to generate the thrust, and the second thrust generating parts P3 and P4 rotate 90 degrees in the horizontal direction and are positioned on the same line as the first thrust generating parts P1 and P2, respectively.

That is, the respective selected supports of the first thrust generating parts P1 and P2 and the respective supports of the second thrust generating parts P3 and P4 are positioned on the same line to form a single wing shape, such that the second thrust generating parts P3 and P4 serve as auxiliary wings of the first thrust generating parts P1 and P2 during high-speed flight or long range cruising (see FIG. 9).

In this case, since the first thrust generating parts P1 and P2 and the second thrust generating parts P3 and P4 may be positioned on the same line as each other, it is preferable that the thrust means 220 of the first thrust generating parts P1 and P2 is formed to be positioned on an upper surface of the support 210 and the thrust means 220 of the second thrust generating parts P3 and P4 is formed to be positioned on a lower surface of the support 210 so that the thrust means 220 of the first thrust generating parts P1 and P2 and the thrust means 220 of the second thrust generating parts P3 and P4 do not interfere with each other.

Further, as illustrated in the drawings, as an example, P1 of the first thrust generating parts and P3 of the second thrust generating parts are coupled to each other to form a wing shape. To this end, it is preferable that P1 and P3, and P2 and P4 correspond to each other so that portions that are in surface contact with each other are coupled to each other, and various examples of surface contact portion shapes are possible.

A configuration for operation of the first thrust generating parts P1 and P2 and the second thrust generating parts P3 and P4 of the high efficiency long range drone according to the third exemplary embodiment of the present invention described above will be described in more detail.

Figure 10:
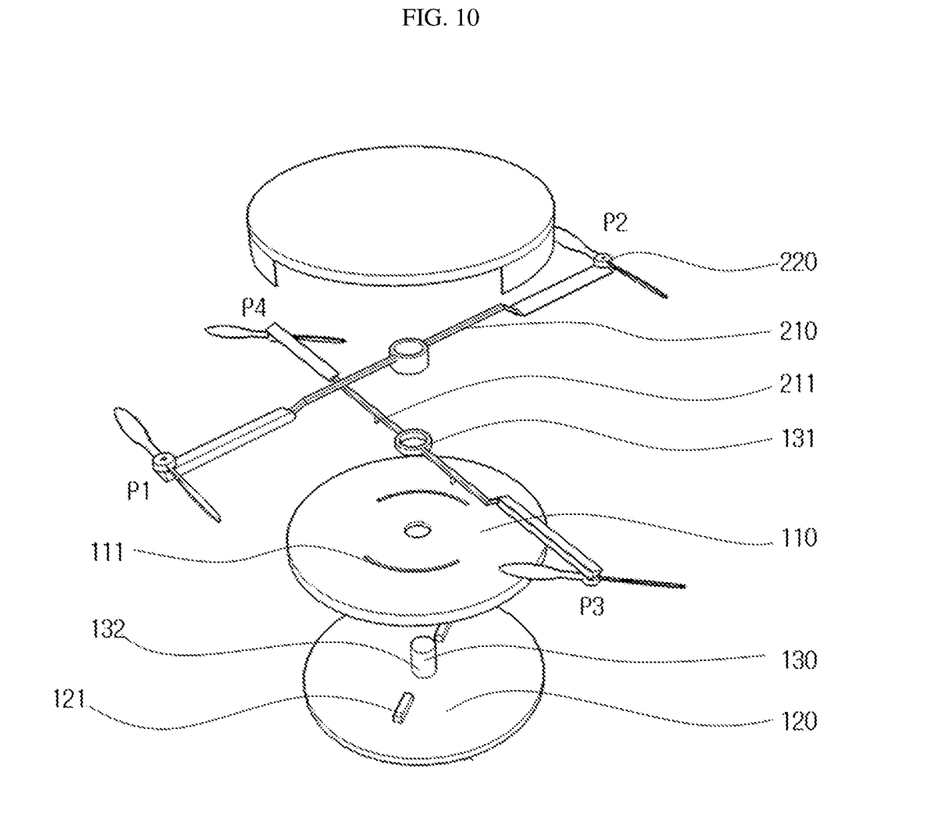
FIG. 10 is an exploded perspective view of a body and a thrust generating part of the high efficiency long range drone according to the third exemplary embodiment of the present invention.
Figure 11:
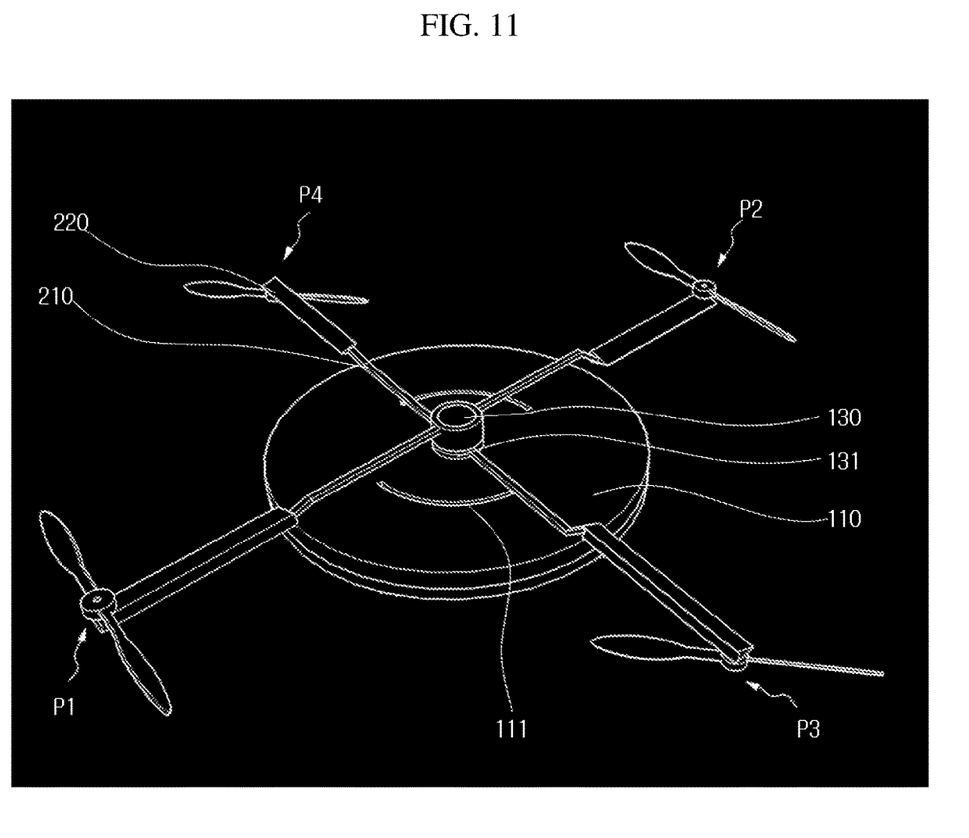
FIG. 11 is a view of an upper body and a thrust generating part of the high efficiency long range drone according to the third exemplary embodiment of the present invention.
Figure 12:
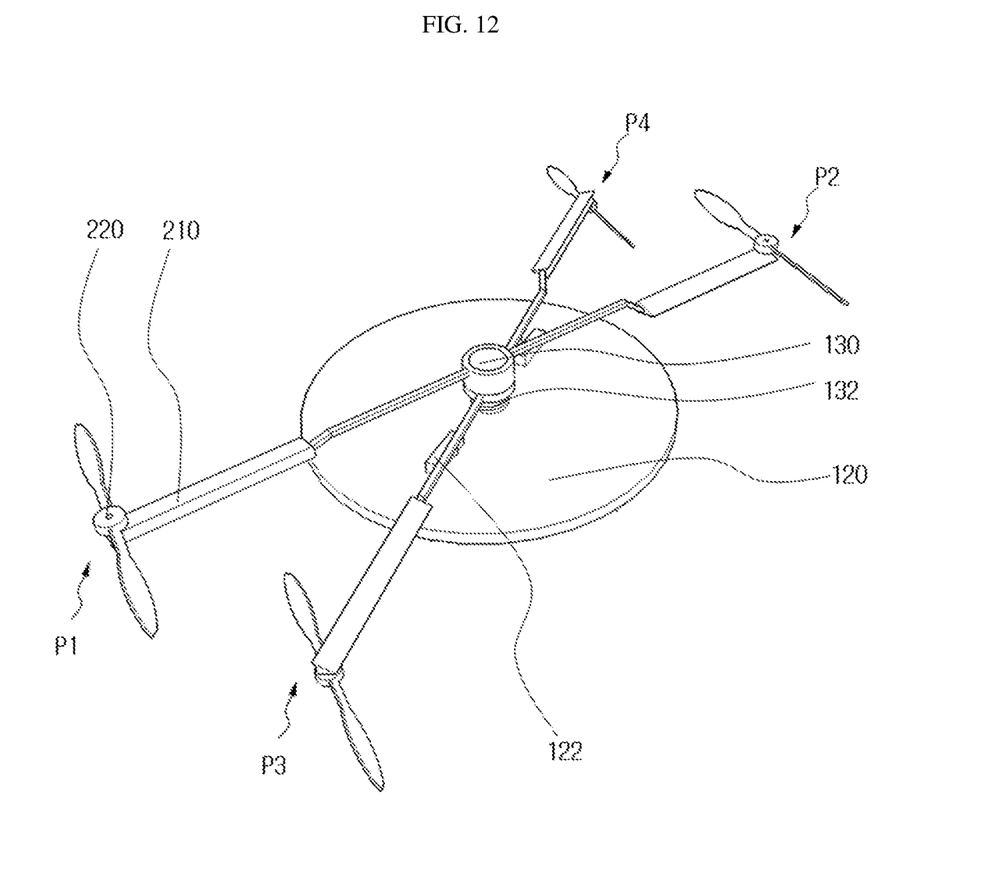
FIG. 12 is a view of a lower body and a thrust generating part of the high efficiency long range drone according to the third exemplary embodiment of the present invention.

FIG. 10 is an exploded perspective view of a body and a thrust generating part of the high efficiency long range drone according to the third exemplary embodiment of the present invention, FIG. 11 is a view of an upper body and a thrust generating part of the high efficiency long range drone according to the third exemplary embodiment of the present invention, and FIG. 12 is a view of a lower body and a thrust generating part of the high efficiency long range drone according to the third exemplary embodiment of the present invention.

Referring to FIGS. 6 to 12, the high efficiency long range drone 1000 according to the third exemplary embodiment of the present invention includes a first pressurizing means 131 formed on the central shaft 130 on the upper body 110 and formed to apply force to the second thrust generating parts P3 and P4 in the directions of the first thrust generating parts P1 and P2.

The first pressurizing means 131 may be variously configured as long as it may apply the force to move the second thrust generating parts P3 and P4 such as an actuator to the first thrust generating parts P1 and P2, but is preferably a spring which is provided on the central shaft and applies the force to move the supports of the second thrust generating parts P3 and P4 to the supports of the first thrust generating parts P1 and P2.

In this case, the first pressurizing means 131 is formed to apply the force to the second thrust generating parts P3 and P4 with the force smaller than the moment of inertia of the first thrust generating parts P1 and P2.

That is, during high-speed flight or cruising, the first thrust generating parts P1 and P2 continue to generate the thrust, and the second thrust generating parts P3 and P4 stop to generate the thrust because the power from the power supplying part is blocked.

This stops the rotation of the rotating parts of the second thrust generating parts P3 and P4 and causes the moment of inertia to be lost, and the first pressurizing means 131 moves the supports 210 of the second thrust generating parts P3 and P4 in the directions of the supports 210 of the first thrust generating parts P1 and P2 through the loss of the moment of inertia.

Further, the upper body 110 includes guide holes 111 corresponding to movement paths of the supports 210 of the second thrust generating parts P3 and P4 and formed to penetrate through the upper body 110, the supports of the second thrust generating parts P3 and P4 include guide protrusions 211 connected and formed to penetrate through the guide holes 111 in a vertical direction below thereof, and the lower body 120 includes lower guide protrusions 122 that are formed to protrude on an upper surface thereof and are in surface contact with the guide protrusions 211 to move the lower body in the directions of the first thrust generating parts P1 and P2.

In this case, the high efficiency long range drone 1000 according to the third exemplary embodiment of the present invention includes a second pressurizing means 132 formed on the central shaft 130 on the lower body 120 to support the lower guide protrusions 122, and formed to apply the force to the lower body 120 toward the first thrust generating parts P1 and P2.

That is, when the second thrust generating parts P3 and P4 lose the moment of inertia because the generation of thrust is stopped, the second thrust generating parts P3 and P4 are moved to the first thrust generating parts P1 and P2 by the first pressurizing means 131, and when the guide protrusions 211 move along the guide holes 111, the supports 210 of the moved second thrust generating parts P3 and P4 allow the guide protrusion 211 and the lower guide protrusion 122 protruding from the upper surface of the lower body 120 to be supported by the second pressurizing means 132 to be in surface contact with each other, thereby moving the lower body 120 in the directions of the first thrust generating parts P1 and P2.

In this case, it is preferable that the lower guide protrusions 122 are formed at the centers of the guide holes 111 in which the second thrust generating parts P3 and P4 move.

In other words, when the second thrust generating parts P3 and P4 are moved to the first thrust generating parts P1 and P2 by the first pressurizing means 131, the supports of the second thrust generating parts P3 and P4 are moved by the force of the first pressurizing means 131 up to 45 degrees, and in the range of 45 to 90 degrees in which the supports 210 of the second thrust generating parts P3 and P4 are moved, the second pressurizing means 132 moves the lower body 120 by 45 degrees through the supported lower guide protrusions 122 to thereby align the landing platform 121 provided on the lower surface of the lower body 120 to be perpendicular to the first thrust generating parts P1 and P2, thereby serving to reducing a resistance area during high-speed flight or cruising, or the like.

Further, the second pressurizing means 132 may be variously configured similarly to the first pressurizing means 131, but is preferably a spring provided on the central shaft 130 to apply the force so that lower body 120 is moved to the first thrust generating parts P1 and P2.

In this case, the second pressurizing means is formed to apply the force to the lower body with a smaller force than the first pressurizing means.

That is, when the power is supplied to the second thrust generating parts P3 and P4 for hovering or low-speed flight, since the moment of inertia is generated in the second thrust generating parts P3 and P4, and the first pressurizing means 131 and the second pressurizing means 132 are formed to apply the force smaller than the moment of inertia, the second thrust generating parts P3 and P4 are rotated 90 degrees in an opposite direction to be positioned at original positions.

In this case, the lower surface of the upper body 110 is further provided with a rotation stopper for blocking the movement of the lower guide protrusions 122 to prevent rotation of the lower body 120 of 45 degrees or more, and as a result, the lower guide protrusions 122 are caught by the rotation stopper and are not rotated by 45 degrees or more, and are supported by the second pressurizing means 132.

Further, during the high-speed flight or cruising of the high efficiency long range drones 1000 according to the third exemplary embodiment of the present invention, it is preferable that the propellers constituting the rotating parts 221 of the second thrust generating parts P3 and P4 are formed so as to be folded in the direction opposite to the flying direction, and thus, it is preferable to minimize drag during high-speed flight or cruising.

As described above, the high efficiency long range drone according to the present invention may increase a mission performance radius as compared to the conventional drone by forming the power supplying part that supplies power to the thrust generating part generating the thrust as the basic power supplying part formed by the engine generator and the auxiliary power supplying part formed by the battery, and selectively supplying the power through the control thereof.

In addition, the high efficiency long range drone according to the present invention uses both the basic power supplying part and the auxiliary power supplying part when large outputs such as takeoff and landing of the drone are required, and uses only the basic power supplying part for high-speed long range cruising flight, thereby making it possible to perform an efficient flight.

In addition, the high efficiency long range drone according to the present invention may have better loading capacity for mission performance than the conventional drone that uses the battery as the power source.

In addition, since the high efficiency long range drone according to the present invention may selectively charge the auxiliary power supplying part formed by the battery when the power is supplied thereto using only the basic power supplying part formed by the engine generator, it is possible to delete a separate task for charging the battery.

In addition, in the high efficiency long range drone according to the present invention, the thrust generating parts may be moved in the horizontal direction and be positioned on the same line, and as a result, it is possible to form the thrust generating parts into a wing shape in which two or more supports are coupled to each other to thereby serve as an auxiliary wing, and it is possible to perform an efficient mission in high-speed flight or long range flight.

In addition, when the high efficiency long range drone according to the present invention uses the auxiliary wings and cruises at high speed, less power is required than the power required to take off and land the drone, and in this case, since engine generator of the basic power supplying part operates at a constant speed so as to exhibit the maximum efficiency performance, and supplies the power required for the flight by only the power of the generator, the long range flight may be efficiently performed.

The invention claimed is:

1. A drone comprising:
a body;
a thrust generating part including a support connected to the body in a horizontal direction and a thrust means provided at an end of the support to generate a thrust;
a power supplying part including an engine generator and a battery, and supplying power to the thrust generating part; and
a controlling part controlling operations of the thrust generating part and the power supplying part, wherein the controlling part performs a control so that the power is supplied to the thrust generating part by using the engine generator and the battery, or the power is supplied to the thrust generating part by using only the engine generator,
wherein the thrust generating part includes:
first thrust generating parts that include two thrust generating parts among four thrust generating parts that are formed to be positioned on a line along one direction, and
second thrust generating parts that include the other two thrust generating parts among the four thrust generating parts that are each perpendicular to the two thrust generating parts of the first thrust generating parts and formed to be positioned on a line along the other direction,
wherein the second thrust generating parts are moved in a selected direction in the horizontal direction and are positioned on the same line as the first thrust generating parts, and selected supports of the second thrust generating parts and the first thrust generating parts are positioned on the same line to form a single wing shape.

2. The drone of claim 1, wherein the body includes: an upper body, a lower body formed below the upper body and having a landing platform provided on a lower surface thereof, and a central shaft connecting the upper body and the lower body to each other in a vertical direction and formed so that the support is coupled to and detachable from the central shaft in a horizontal direction.

3. The drone of claim 2, wherein the thrust means includes: a rotating part including a propeller generating the thrust by rotation, and a motor performing an operation of the rotating part through the power supplied from the power supplying part.

4. The drone of claim 3, wherein the drone is a quadcopter in which the four thrust generating parts are formed to be spaced apart from each other at the same intervals in the horizontal direction.

5. The drone of claim 3, wherein the first thrust generating parts are formed to generate a thrust larger than the second thrust generating parts.

6. The drone of claim 5, wherein the rotating parts of the first thrust generating parts are formed to have a propeller size in order to generate a thrust larger than that of the rotating parts of the second thrust generating parts, and the motors of the first thrust generating parts are provided to generate an output larger than that of the motors of the second thrust generating parts.

7. The drone of claim 6, wherein the thrust means of the first thrust generating parts is formed on an upper surface of the support, and the thrust means of the second thrust generating parts is formed on a lower surface of the support.

8. The drone of claim 7, wherein the central shaft includes a first spring formed on the upper body and formed to apply force to the second thrust generating parts in the directions of the first thrust generating parts.

9. The drone of claim 8, wherein the spring is formed to apply the force to the second thrust generating parts with the force smaller than the moment of inertia of the first thrust generating parts.

10. The drone of claim 9, wherein the upper body includes guide holes corresponding to movement paths of the supports of the second thrust generating parts and formed to penetrate through the upper body, the supports of the second thrust generating parts include guide protrusions moved to penetrate through the guide holes in a vertical direction below thereof, and the lower body includes lower guide protrusions that are formed to protrude on an upper surface thereof and are in surface contact with the guide protrusions to move the lower body.

11. The drone of claim 10, wherein the central shaft further includes a second spring formed on the lower body and applying force to the lower body in the directions of the first thrust generating parts.

12. The drone of claim 11, wherein the second spring applies the force to the lower body with a smaller force than the first pressurizing means.

* * * * *